United States Patent [19]

Teranishi et al.

[11] Patent Number: 4,946,284
[45] Date of Patent: Aug. 7, 1990

[54] MIXING HEAD

[75] Inventors: Masatoshi Teranishi; Noboru Hara; Katsumi Tachi; Hisayasu Sugita, all of Aichi, Japan

[73] Assignee: Toyoda Gosei Co., Ltd., Nishikasugai, Japan

[21] Appl. No.: 344,591

[22] Filed: Apr. 28, 1989

[30] Foreign Application Priority Data

Apr. 30, 1988 [JP] Japan .................. 63-108541

[51] Int. Cl.$^5$ ............................ B01F 15/02
[52] U.S. Cl. ..................... 366/131; 366/150
[58] Field of Search ............ 366/150, 159, 167, 173, 366/177, 182, 131, 134, 136, 137; 425/543, 557, 573, 542, 200, 206

[56] References Cited

U.S. PATENT DOCUMENTS

| | | | |
|---|---|---|---|
| 4,017,242 | 4/1977 | Mercer | 425/543 |
| 4,749,554 | 6/1988 | Proksa | 425/543 |
| 4,772,129 | 9/1988 | Woitzel | 366/177 |

FOREIGN PATENT DOCUMENTS 62-128705 6/1987 Japan .
62-128706 6/1987 Japan .
62-130806 6/1987 Japan .
63-31723 2/1988 Japan .

*Primary Examiner*—Robert W. Jenkins
*Attorney, Agent, or Firm*—Cushman, Darby & Cushman

[57] ABSTRACT

In a mixing head for mixing plural kinds of liquid materials, a first forward movement passage for opening a discharge control valve which control supplying the liquid materials into a mixing chamber, is ramified from a second forward movement passage for closing a circulation control valve which controls the circulation of the liquid materials, and extends across a spool of the circulation control valve. The spool is provided with a groove for opening the first forward movement passage when the circulation control valve is in a closed state. Further, a restriction passage having a check valve for keeping a working fluid from flowing into a first cylinder including a first piston of the discharge control valve, is formed to be communicated with the first cylinder at a side of the first forward movement passage and is ramified from the second forward movement passage.

5 Claims, 4 Drawing Sheets

MIXING HEAD

BACKGROUND OF THE INVENTION

The present invention relates to a mixing head for an RIM molding machine which mixes plural kinds of liquid materials such as urethane resin, epoxy resin and polyamide resin.

The present invention is an improvement of a mixing head disclosed in the co-pending U.S. Patent Application No. 07/162,206. FIG. 6 shows such a mixing head. In the mixing head, two raw liquid materials of a polyol A and an isocyanate B are mixed with each other in a mixing chamber 3 and the mixture of the materials is discharged to a sprue gate 9a of a molding die 9. The mixing head 1 has a normally-closed discharge control valve 16 for opening and closing inflow passages 4A and 4B for the liquid materials A and B to the mixing chamber. The valve 16 comprises a valve shaft 15 which is moved back and forth in the mixing chamber 3, and a first piston 14 which is coupled with the valve shaft and is moved back and forth in a first cylinder 11 provided in a body 2 of the mixing head 1.

The mixing head 1 also has a normally-open circulation control valve 26 for opening and closing return passages 5A and 5B ramified from the inflow passages 4A and 4B. The valve 26 comprises a spool 25 having annular grooves 25a and 25b for opening and closing the return passages 5A and 5B, and a second piston 24 which is coupled with the spool and is moved back and forth in a second cylinder 21 provided in the body 2 of the mixing head 1.

A right-hand chamber (as to FIG. 6) 11a of the first cylinder 11 communicates with a first forward movement passage 12 for a working oil 0 to move the first piston 14 leftward (as to FIG. 6) to open the discharge control valve 16. A left-hand chamber 11b of the first cylinder 11 communicates with a first backward movement passage 13 for the working oil 0 to move the first piston 14 rightward to close the discharge control valve 16.

A right-hand chamber 21a of the second cylinder 21 communicates with a second forward movement passage 22 for the working oil 0 to move the second piston 24 leftward to close the circulation control valve 26. A left-hand chamber 21b of the second cylinder 21 communicates with a second backward movement passage 23 for the working oil 0 to move the second piston 24 rightward to open the circulation control valve 26.

The first and the second forward movement passages 12 and 22 communicate with each other and are connected to a hydraulic pump 7 and an oil tank 8 through a four-port two-position electromagnetic changeover valve 6. The first and the second backward movement passages 13 and 23 communicate with each other and are connected to the hydraulic pump 7 and the oil tank 8 through the changeover valve 6.

When the mixture M of the materials A and B is to be supplied from the mixing head 1 to the molding die 9, the changeover valve 6 is put in an operational position as shown in FIG. 7. As a result, the pressure of the working oil 0 acts to the right-hand chambers 11a and 21a of the first and the second cylinders 11 and 21 through the first and the second forward movement passages 12 and 22 so that the first and the second pistons 14 and 24 are moved leftward (as to FIG. 7) to open the discharge control valve 16 and close the circulation control valve 26. At that time, the valve shaft 15 of the valve 16 is moved back so that the mixing chamber 3 is formed, the inflow passages 4A and 4B are opened, the liquid materials A and B are mixed with each other in the mixing chamber, and the mixture M of the materials is supplied from the mixing head 1 to the molding die 9.

When the supply of the mixture M from the mixing head 1 to the molding die 9 is to be stopped, the changeover valve 6 is put in the original position thereof as shown in FIG. 6. As a result, the pressure of the working oil 0 acts to the left-hand chambers 11b and 21b of the first and the second cylinders 11 and 21 through the backward movement passages 13 and 23 so that the first and the second pistons 14 and 24 are moved rightward to close the discharge control valve 16 and open the circulation control valve 26. At that time, the valve shaft 15 of the discharge control valve 16 is moved forth so that the inflow passages 4A and 4B are closed, the return passages 5A and 5B are opened, the liquid materials A and B circulate through the passages therefor, respectively, and the supply of the mixture M from the mixing head 1 is stopped.

However, an extraneous substance such as hardened materials of the raw liquid materials A and B or the mixture M clings to the outside circumferential surfaces of the valve shaft 15 and the spool 25 so that the valve shaft and the spool are likely to be hindered from being smoothly moved back and forth.

When the spool 25 is moved later than the valve shaft 15 due to the hindrance at the beginning of the supply of the mixture M from the mixing head 1 to the molding die 9, the inflow passages 4A and 4B are opened while the return passages 5A and 5B remain opened, so that the pressure of mixing the liquid materials A and B in the mixing chamber 3 falls. At that time, the liquid materials A and B are not well mixed with each other, due to the fall in the pressure and the mixture M not sufficiently mixed, is supplied to the molding die 9. Accordingly, the molded product of the mixture M becomes defective.

SUMMARY OF THE INVENTION

The present invention was made in order to solve the above-mentioned problems.

Accordingly, it is an object of the present invention to provide a mixing head which mixes liquid materials with each other through the action of two control valves to supply the mixture of the materials to a molding die and is capable of preventing the occurrence of defective products which are liable to be produced in the initially supplied portion of the mixture.

A mixing chamber, a discharge control valve and a circulation control valve are provided in the body of the mixing head. A plurality of kinds of liquid materials flowing into the mixing chamber are mixed with each other therein so that the mixture of the materials is discharged from the chamber. The discharge control valve opens inflow passages for the liquid materials to flow into the mixing chamber, and closes the inflow passages throughout the period of stoppage of the discharge of the mixture. The circulation control valve closes return passages ramified from the inflow passages, and opens the return passages throughout the period. The discharge control valve comprises a first piston which is moved back and forth in the body of the mixing head, and a valve shaft with the first piston so as to be moved back and forth. The circulation control valve comprises a second piston which is moved back and forth in the body of the mixing head, and a spool coupled with the second piston so as to be moved back and forth. A first cylinder fitted with the first piston communicates with a first forward movement passage and a first backward movement passage so that when a working fluid flows into the first cylinder through the first forward movement passage or the first backward movement passage, the first piston is moved to open or close the discharge control valve. A second cylinder fitted with the second piston communicates with a second forward movement passage and a second backward movement passage so that when the working fluid flows into the second cylinder through the second forward movement passage or the second backward movement passage, the second piston is moved to close or open the circulation control valve. The mixing head is characterized in that the first forward movement passage is ramified from the second forward movement passage, and extends across the spool of the circulation control valve; the spool of the circulation control valve has a groove for opening the first forward movement passage when the circulation control valve is closed; and a restriction passage ramified from the second forward movement passage and provided with a check valve for keeping the working fluid from flowing into the first cylinder through the restriction passage communicates with the first cylinder on the same side thereof as the first forward movement passage does.

When the application of the pressure of the working fluid to the second forward movement passage is started in order to mix the liquid materials with each other to supply the mixture of them to the molding die, the second piston in the second cylinder and the spool of the circulation control valve are moved in such a direction as to close the valve. At that time, the groove of the spool of the valve is not yet located at the first forward movement passage ramified from the second forward movement passage, so that the first forward movement passage remains closed. Besides, since the restriction passage ramified from the second forward movement passage is provided with the check valve, the working fluid is kept from flowing into the first cylinder on the side thereof at the first forward movement passage, through the restriction passage. For these reasons, at the beginning of the movement of the spool of the circulation control valve, i.e., at the beginning of the closure of the valve, the first piston in the first cylinder is not moved, so that the discharge control valve is not opened. After that, the spool of the circulation control valve completely closes the return passages, and the groove of the spool is located at the first forward movement passage so that the passage is opened. As a result, the pressure of the working fluid acts to the first cylinder through the first forward movement passage to move the first piston to open the discharge control valve. Consequently, the liquid materials flows into the mixing chamber as the return passages remain closed. For that reason, the mixing pressure of the liquid materials in the mixing chamber does not fall, so that the materials are well mixed with each other into a prescribed mixed state, and the mixture of the material is discharged from the mixing chamber to the molding die. Since the discharge control valve is opened as the circulation control valve surely remains closed, at the beginning of the mixing of the liquid materials and the supply of the mixture of them from the mixing head to the molding die, as described above, the mixing pressure of the materials in the mixing chamber at that beginning is prevented from falling to insufficiently mix the materials with each other to make the molded product of the mixture of the materials defective.

When the pressure of the working fluid is thereafter applied to the first and the second backward movement passages in order to stop mixing the liquid materials with each other to supply the mixture of them from the mixing head to the molding die, the working fluid in the first cylinder on the side thereof at the first forward movement passage is discharged from the cylinder mainly through the check valve in the restriction passage, and the working fluid in the second cylinder on the side thereof at the first forward movement passage is discharged from the second cylinder through the second forward movement passage. As a result, the first piston in the first cylinder and the second piston in the second cylinder are moved to close the discharge control valve and open the circulation control valve to stop the supply of the mixture of the liquid materials from the mixing head to the molding die and circulate the liquid materials through the inflow passages and the return passages therefor, respectively. Since the discharge control valve is closed no later than the circulation control valve is opened, at the end of the mixing of the liquid materials and the supply of the mixture of them to the molding die, the mixing pressure of the materials in the mixing chamber is prevented from falling.

DETAILED DESCRIPTION OF THE PREFERRED

Embodiment of the present invention will be hereafter described in detail with reference to the drawings attached hereto.

Figure 1:
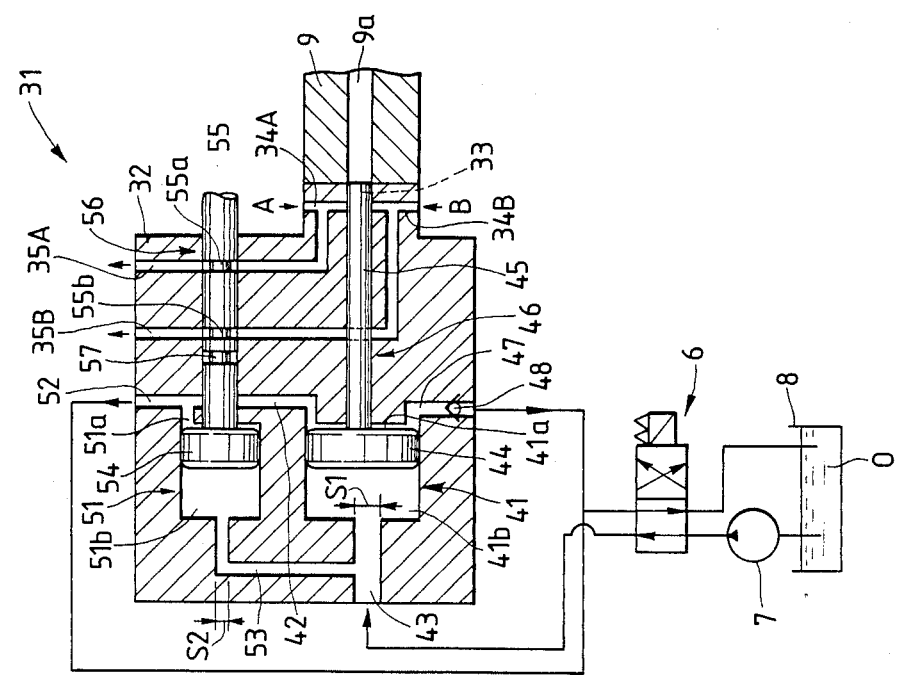
FIG. 1 is a sectional view showing a mixing head of an embodiment of the present invention, in which supply of molded materials is stopped (normal state)

FIG. 1 shows a mixing head 31 of an embodiment of the present invention, in which two liquid materials of a polyol A and an isocyanate B are mixed with each other in a mixing chamber 33 and the mixture of the materials is discharged from the head to a sprue gate 9a of a molding die 9.

A body 32 of the mixing head 31 is provided with inflow passages 34A and 34B for permitting the liquid materials A and B to flow into the mixing chamber 33, return passages 35A and 35B for returning the liquid materials from the inflow passages, a normally-closed discharge control valve 46 which opens the inflow passages to permit the liquid materials to flow into the mixing chamber and which closes the inflow passages to stop the supply of the liquid materials, and a normally-open circulation control valve 56 for opening and closing the return passages 35A and 35B.

The discharge control valve 46 comprises a valve shaft 45 which is moved back and forth in the mixing chamber 33, and is coupled with a first piston 44 which is moved back and forth in a first cylinder 41 provided in the body 32.

The circulation control valve 56 comprises a spool 55 having annular grooves 55a and 55b for opening and closing the return passages 35A and 35B, and is coupled with a second piston 54 which is moved back and forth in a second cylinder 51 provided in the body 32.

A right-hand chamber 41a of the first cylinder 41 communicates with a first forward movement passage 42 for a working oil 0 to move the first piston 44 leftward (as to FIG. 1) to open the discharge control valve 46. A left-hand chamber 41b of the first cylinder 41 communicates with a first backward movement passage 43 for the working oil 0 to move the first piston rightward to close the discharge control valve 46.

A right-hand chamber 51a of the second cylinder 51 communicates with a second forward movement passage 52 for the working oil 0 to move the second piston 54 leftward (as to FIG. 1) to close the circulation control valve 56. A left-hand chamber 51b of the second cylinder 51 communicates with a second backward movement passage 53 for the working oil 0 to move the second piston 54 rightward to open the circulation control valve 56.

Figure 6:
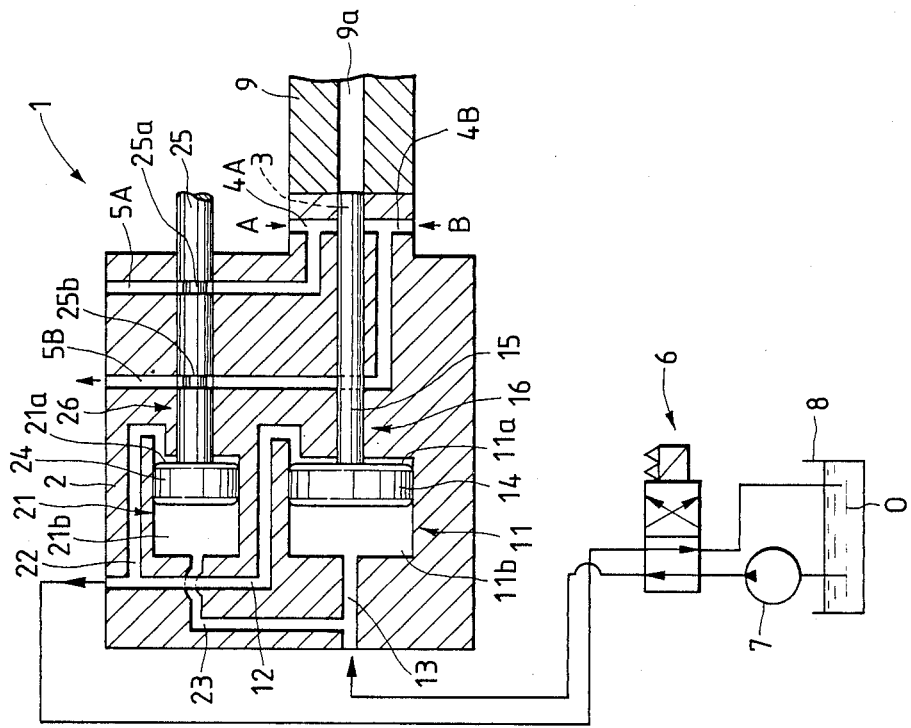
FIG. 6. is a sectional view showing a mixing head as disclosed in U.S. patent application No. 07/162,206, in which supply of molded materials is stopped.

The above-mentioned elements of the mixing head 31 are similar to those of the mixing head shown in FIG. 6. However, the construction of the mixing head 31 is different from that of the mixing head of FIG. 6 in the following.

The first forward movement passage 42 is ramified from the second forward movement passage 52, and extends across the spool 55 of the circulation control valve 56.

The spool 55 is provided with an annular groove 57 for closing the first forward movement passage 42 at the normal time of opening of the circulation control valve 56, and for opening the first forward movement passage 42 at the time of closure of the circulation control valve 56.

The right-hand chamber 41a of the first cylinder 41 communicates also with a restriction passage 47 ramified from the second forward movement passage 52 and provided with a check valve 48 for keeping the working oil 0 from flowing into the first cylinder 41 through the restriction passage.

The cross-sectional area S1 of the first backward movement passage 43 communicating with the left-hand chamber 41b of the first cylinder 41 is larger than that S2 of the second backward movement passage 53 communicating with the left-hand chamber 51b of the second cylinder 51.

The second forward movement passage 52 communicating with the first forward movement passage 42 and the restriction passage 47, and the first backward movement passage 43 communicating with the second backward movement passage 53 are connected to a hydraulic pump 7 and an oil tank 8 through a four-port two-position electromagnetic changeover valve 6, as in the mixing head of FIG. 6.

The operation of the mixing head 31 will now be described.

Figure 2:
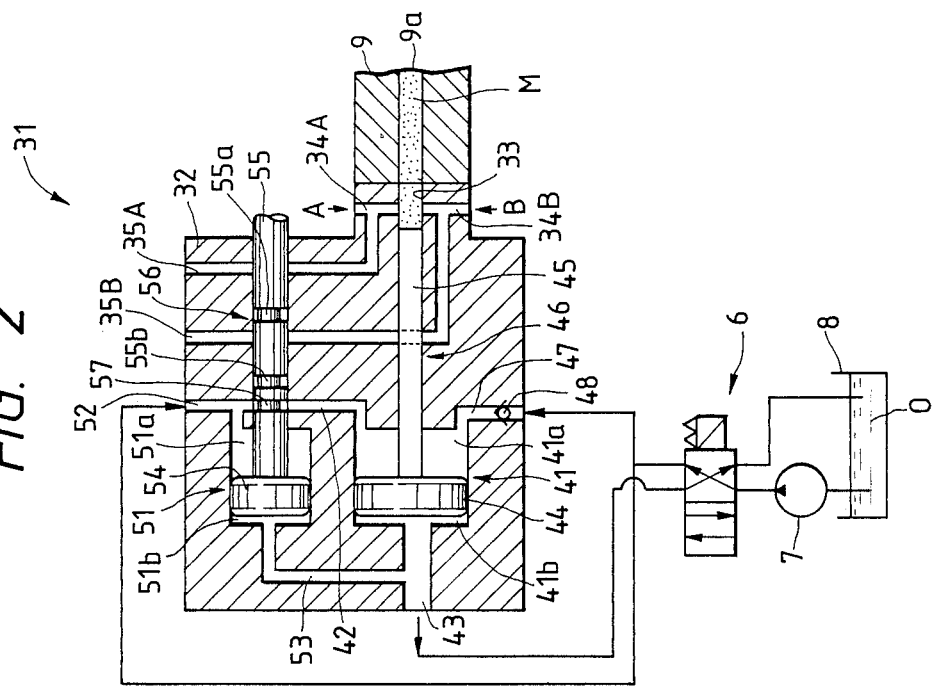
FIG. 2 is a sectional view showing the mixing head shown in FIG. 1, in which the molded materials are being supplied.

When the liquid materials A and B are to be mixed with each other in the mixing chamber 33 to supply the mixture of the materials from the mixing head 31 to the molding die 9, the changeover valve 6 is put in an operational position as shown in FIG. 2. As a result, the pressure of the working oil 0 is exerted to the right-hand chamber 51a of the second cylinder 51 through the second forward movement passage 52 so that the second piston 54 in the second cylinder 51 and the spool 55 is moved leftward to close the circulation control valve 56.

At that time, the groove 57 of the spool 55 is not yet located at the first forward movement passage 42 ramified from the second forward movement passage 52, so that the first forward movement passage remains closed. Besides, since the check valve 48 is provided in the restriction passage 47 ramified from the second forward movement passage 52, the working oil 0 is kept from flowing into the right-hand chamber 41a of the first cylinder 41 through the restriction passage. For these reasons, the first piston 44 in the first cylinder 41 is not moved leftward at the beginning of the leftward movement of the spool 55, i.e., at the beginning of closure of the circulation control valve 56, so that the discharge control valve 46 remains closed.

After that, the spool 55 of the circulation control valve 56 completely closes the return passages 35A and 35B and is moved leftward further so that the groove 57 of the spool is located at the first forward movement passage 42 to open it. As a result, the pressure of the working oil 0 is exerted to the right-hand chamber 41a of the first cylinder 41 through the first forward movement passage 42 so that the first piston 44 and the spindle 45 is moved leftward to open the discharge control valve 46.

Consequently, the liquid materials A and B flow into the mixing chamber 33 through the inflow passages 34A and 34B as the return passages 35A and 35B remain closed. For that reason, a mixing pressure of the liquid materials A and B in the mixing chamber does not fall at the beginning of the mixing of the materials therein and the mixture M of the materials is supplied from the mixing head 31 to the molding die 9 with a predetermined mixing pressure, so that the molded product of the mixture M is prevented from becoming defective.

When the supply of the mixture M of the materials from the mixing head 31 to the molding die 9 are to be stopped, the changeover valve 6 is put in the original position thereof as shown in FIG. 1. As a result, the pressure of the working oil 0 stops acting to the right-hand chambers 41a and 51a of the first and the second cylinders 41 and 51 through the first and the second forward movement passages 42 and 52, and starts acting to the left-hand chambers 41b and 51b of the first and the second cylinders through the first and the second backward movement passages 43 and 53. Then the first piston 44 in the first cylinder 41 and the valve shaft 45 is moved rightward to close the discharge control valve 46, and to move the second piston 54 in the second cylinder 51 and the spool 55 is moved rightward to open the circulation control valve 56. At that time, the working oil 0 in the right-hand chamber 51a of the second cylinder 51 returns to the oil tank 8 through the second forward movement passage 52. The working oil in the right-hand chamber 41a of the first cylinder 41 returns to the oil tank through the first forward movement passage 42, the restriction passage 47 and the second forward movement passage until the closure of the first forward movement passage by the spool 55 and returns to the oil tank through the restriction passage 47 after the closure of the first forward movement passage by the spool.

Consequently, the first piston 44 in the first cylinder 41, the second piston 54 in the second cylinder 51 are moved rightward to close the discharge control valve 46 and open the circulation control valve 56 so that supplying of the mixture M from the mixing head 31 to the molding die 9 is stopped and the liquid materials A and B circulates through the return passages 35A and 35B.

The cross-sectional area S1 of the first backward movement passage 43 is larger than that S2 of the second backward movement passage 53. The back pressure in the right-hand chamber 41a of the first cylinder 41 is lower than that in the right-hand chamber 51a of the second cylinder 51 because the restriction passage 47 communicates with the right-hand chamber 41a. Further, the pressure of the working oil 0 in the first backward movement passage 42 acts to the second backward movement passage 52 when the changeover valve 6 is put in the operational position as shown in FIG. 2. For these reasons, at the beginning of the action of the pressure of the working oil 0 to the first and the second backward movement passages 43 and 53, for the oil is liable to flow into the left-hand chamber 41b of the first cylinder 41 through the first backward movement passage 43 to move the first piston 41 rightward more quickly than the second piston 54. In other words, the circulation control valve 56 is opened after the closure of the discharge control valve 46 at the end of mixing, so that the mixing pressure of the liquid materials A and B in the mixing chamber 33 is prevented from falling. Accordingly, the mixture M of the materials with a low mixing pressure is not supplied to the molding die 9 so that the molded product of the materials do not become defective.

Figure 3:
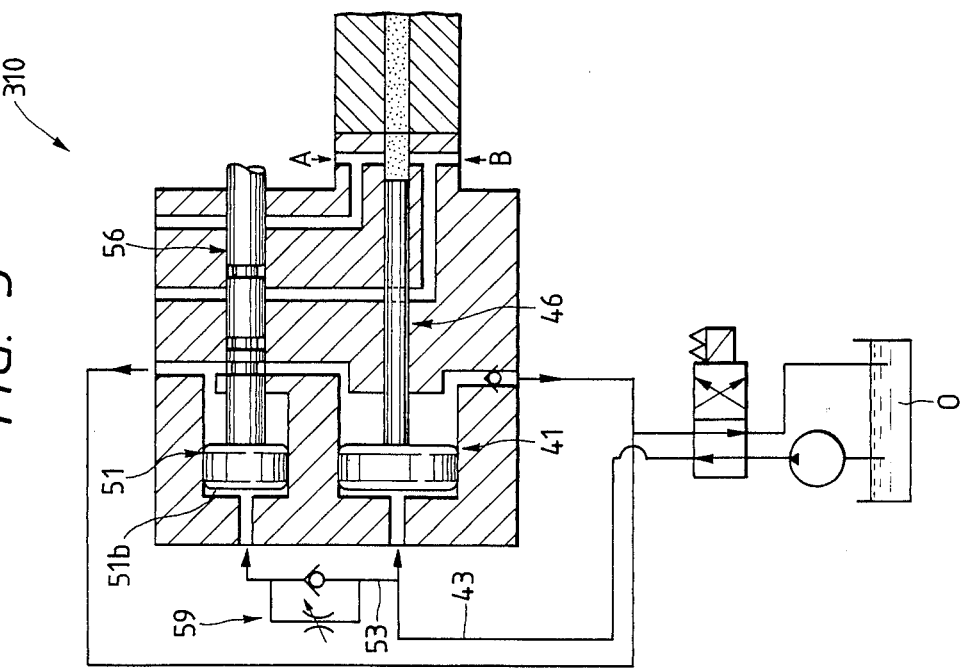
FIG. 3 is a sectional view showing a mixing head which is a modification of the embodiment.

FIG. 3 shows a mixing head 310 which is a modification of the above-described embodiment. The modification differs from the embodiment in the constitution for opening the circulation control valve after closing the discharge control valve, but produces the same operational effect as the embodiment. In the mixing head 310 shown in FIG. 3, a second backward movement passage 53 ramified from a first backward movement passage 43 is provided with a one-way restriction valve unit 59 in which a flow rate control valve and a check valve are connected in parallel with each other to regulate a working oil 0 flowing into a left-hand chamber (as to FIG. 3) 51b of a second cylinder 51.

Figure 4:
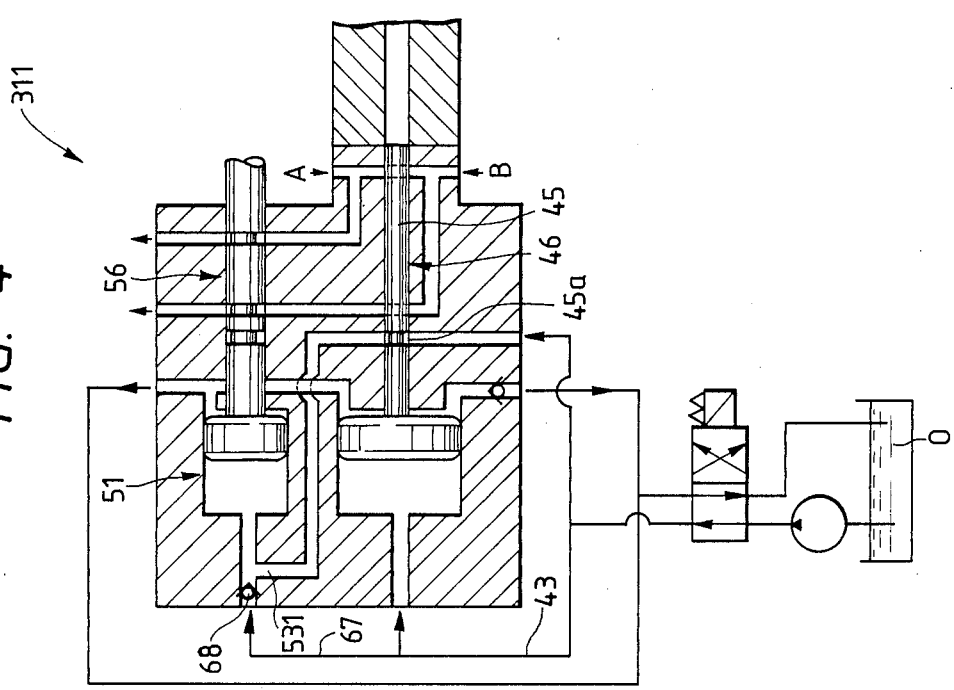
FIG. 4 is a sectional view showing a mixing head which is another modification of the embodiment.
Figure 5:
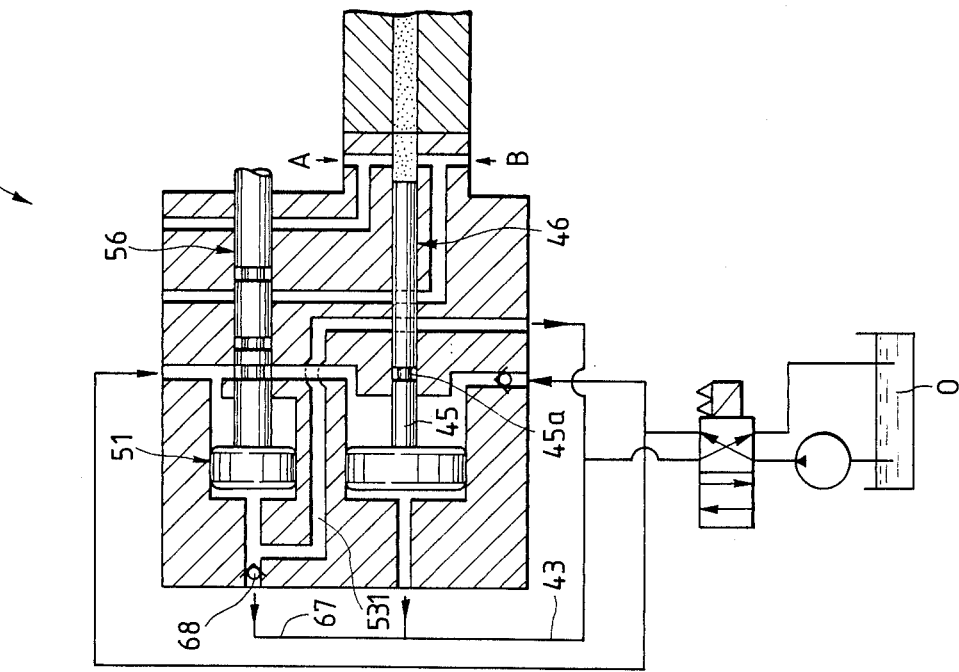
FIG. 5 is a sectional view showing the mixing head shown in FIG. 4, in which the molded materials are being supplied.
Figure 7:
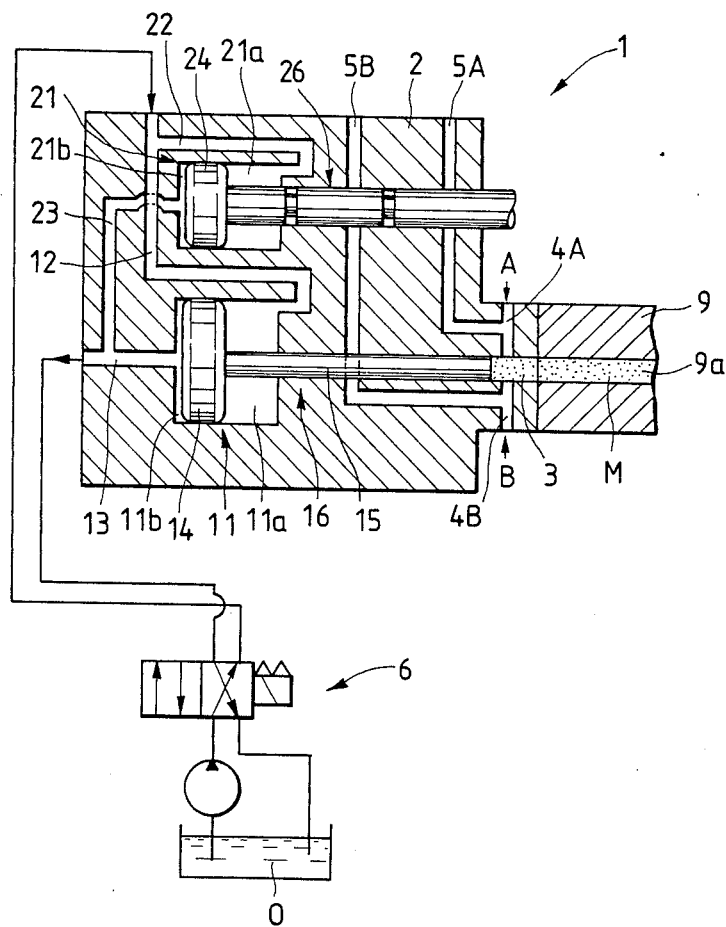
FIG. 7. is a sectional view showing the mixing head shown in FIG. 6, in which the molded materials are being supplied.

FIGS. 4 and 5 show a mixing head 311 which is another modification of the above described embodiment. The modification differs from the embodiment in the constitution for opening the circulation control valve after closing the discharge control valve, but produces the same operational effect as the embodiment. In the mixing head 311 shown in FIGS. 4 and 5, a second backward movement passage 531 ramified from a first backward movement passage 43 extends across a valve shaft 45 of the discharge control valve 46.

The valve shaft 45 has a groove 45a for opening the second backward movement passage 531 when the discharge control valve 46 is closed. A restriction passage 67 communicating with the first backward movement passage 43 is connected to the second backward movement passage 531 near a second cylinder 51 and provided with a check valve 68 for keeping a working oil 0 from flowing into the second cylinder 51 through the restriction passage.

In this modification, the construction of the mixing head of FIG. 1 in which the discharge control valve 46 is opened after the circulation control valve 56 is closed at the start of supplying raw materials, is applied to the case in which the circulation valve 56 is opened after the discharge control valve 46 is closed at the end of mixing raw materials.

What is claimed is:

1. A mixing head, comprising:
   a mixing chamber;
   a plurality of inflow passages terminating at said mixing chamber for plural kinds of liquid materials a plural liquid materials can be flowed through said inflow passages into, mixed with each other discharged from said mixing chamber;
   a plurality of return passages each branched from a respective inflow passage;
   a discharge control valve for opening and closing said inflow passages for said liquid materials flowed into said mixing chamber, said discharge control valve including a shaft and a first piston, said shaft extending from said first piston, said piston moving back and forth so that said valve shaft moves back and forth in said mixing chamber, said discharge control valve being normally in a closed state;
   a circulation control valve for simultaneously opening and closing said return passages, said circulation control valve including a spool and a second piston, said spool extending across said return passages from said second piston and moving back and forth, said circulation control valve being normally in an open state;
   a first cylinder including said first piston therein;
   a first forward movement passage communicated with said first cylinder, said first piston being moved to open said discharge control valve when a working fluid flows into said first forward movement passage;
   a first backward movement passage communicated with said first cylinder, said first piston being moved to close said discharge control valve when said working fluid flows into said backward movement passage;
   a second cylinder including said second piston therein;
   a second forward movement passage communicated with said second cylinder, said second piston being moved to close said circulation control valve when said working fluid flows into said second forward movement passage; and
   a second backward movement passage communicated with said second cylinder, said second piston being moved to open said circulation control valve when said working fluid flows into said second backward movement passage;
   wherein said first forward movement passage is branched from said second forward movement passage and extends across said spool;
   said spool is provided with a groove for opening said first forward movement passage when said circulation control valve is in a closed state; and
   a restriction passage having a check valve for keeping said working fluid from flowing into said first cylinder is formed to be communicated with said first cylinder at a side of said first forward movement passage and is branched from said second forward movement passage.

2. A mixing head as claimed in claim 1, wherein an open area of said first backward movement passage is larger than that of said second backward movement passage.

3. A mixing head as claimed in claim 1, further comprising a one-way restriction valve unit connect to said second backward movement passage.

4. A mixing head as claimed in claim 3, wherein said one-way restriction valve includes a flow rate control valve and a check valve connected in parallel with said flow rate control valve.

5. A mixing valve as claimed in claim 1, wherein said second backward movement passage extends across said valve shaft and a groove is provided in said valve shaft.

* * * * *